US012113272B2

(12) United States Patent
Huang et al.

(10) Patent No.: US 12,113,272 B2
(45) Date of Patent: Oct. 8, 2024

(54) WEARABLE DEVICE

(71) Applicant: PEGATRON CORPORATION, Taipei (TW)

(72) Inventors: Chin-Ting Huang, Taipei (TW); Hsi-Kai Hung, Taipei (TW); Chun-Kai Wang, Taipei (TW); Sony Chayadi, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 110 days.

(21) Appl. No.: 17/982,248

(22) Filed: Nov. 7, 2022

(65) Prior Publication Data

US 2023/0141140 A1 May 11, 2023

(30) Foreign Application Priority Data

Nov. 11, 2021 (TW) ................................ 110142010

(51) Int. Cl.

| | |
|---|---|
| ***H01Q 1/27*** | (2006.01) |
| ***G04G 17/04*** | (2006.01) |
| ***H01Q 1/48*** | (2006.01) |
| ***H01Q 5/30*** | (2015.01) |
| *H01Q 1/52* | (2006.01) |

(52) U.S. Cl.
CPC ............. *H01Q 1/273* (2013.01); *G04G 17/04* (2013.01); *H01Q 1/48* (2013.01); *H01Q 5/30* (2015.01); *H01Q 1/526* (2013.01)

(58) Field of Classification Search
CPC ........ H01Q 1/22; H01Q 1/2291; H01Q 1/273; H01Q 1/44; H01Q 1/48; H01Q 1/50; H01Q 1/52; H01Q 1/526; H01Q 5/30; H01Q 5/364; H01Q 9/42; H01Q 19/106
See application file for complete search history.

(56) References Cited

FOREIGN PATENT DOCUMENTS

| | | | |
|---|---|---|---|
| CN | 108183328 | 6/2018 | |
| CN | 108232449 | 6/2018 | |
| CN | 112003006 | 11/2020 | |
| CN | 112003006 A | * 11/2020 | ............. G04R 60/00 |

* cited by examiner

*Primary Examiner* — Hoang V Nguyen
(74) *Attorney, Agent, or Firm* — J.C. PATENTS

(57) ABSTRACT

A wearable device includes a conductive bottom shell, a conductive frame, an insulating member, and a circuit board. The conductive frame is disposed above the conductive bottom shell and separated from the conductive bottom shell. The conductive frame functions as an antenna and includes a feeding terminal and a first ground terminal. The insulating member is disposed between the conductive bottom shell and the conductive frame and prevents the conductive bottom shell from conducting electricity to the conductive frame. The circuit board is disposed inside the conductive frame, separated from the conductive bottom shell and disposed between the insulating member and the conductive frame. The feeding terminal and the first ground terminal are electrically connected to the circuit board.

11 Claims, 4 Drawing Sheets

WEARABLE DEVICE

CROSS-REFERENCE TO RELATED APPLICATION

This application claims the priority benefit of Taiwan application serial no. 110142010, filed on Nov. 11, 2021. The entirety of the above-mentioned patent application is hereby incorporated by reference herein and made a part of this specification.

BACKGROUND

Technology Field

The disclosure relates to a wearable device, and in particular, to a wearable device with an antenna.

Description of Related Art

For a wearable device to have a fine-looking appearance, the antenna is usually designed inside a metal casing. However, such a way makes it difficult to reduce the size of the wearable device. If the metal casing of the wearable device is used as an antenna, the electromagnetic waves of the antenna are easily absorbed by a human body when the wearable device is worn on the human body, which makes the antenna efficiency difficult to perform well.

SUMMARY

The disclosure provides a wearable device, which may have a fine-looking appearance and may reduce the probability that the electromagnetic waves of the antenna is absorbed by a human body.

The wearable device of the disclosure includes a conductive bottom shell, a conductive frame, an insulating member, and a circuit board. The conductive frame is disposed above the conductive bottom shell and separated from the conductive bottom shell. The conductive frame functions as an antenna and includes a feeding terminal and a first ground terminal. The insulating member is disposed between the conductive bottom shell and the conductive frame, and the insulating member prevents the conductive bottom shell from conducting electricity to the conductive frame. The circuit board is disposed inside the conductive frame, separated from the conductive bottom shell, and disposed between the insulating member and the conductive frame. The feeding terminal and the first ground terminal are electrically connected to the circuit board.

In an embodiment of the disclosure, the above-mentioned circuit board includes a first elastic piece and a second elastic piece, the first elastic piece abuts the feeding terminal, and the second elastic piece abuts the first ground terminal.

In an embodiment of the disclosure, the above-mentioned conductive frame is adapted to resonate at a first frequency band, and the length from the feeding terminal to the first ground terminal is one-half wavelength of the first frequency band.

In an embodiment of the disclosure, the above-mentioned conductive frame includes a second ground terminal, the second ground terminal is electrically connected to the circuit board, and the length from the feeding terminal to the second ground terminal is one-half wavelength of the first frequency band.

In an embodiment of the disclosure, the above-mentioned conductive frame includes a second ground terminal, and the second ground terminal is electrically connected to the circuit board. Moreover, the conductive frame is further adapted to resonate at a second frequency band different from the first frequency band, and the length from the feeding terminal to the second ground terminal is one-half wavelength of the second frequency band.

In an embodiment of the disclosure, the above-mentioned circuit board includes a third elastic piece, and the third elastic piece abuts the second ground terminal.

In an embodiment of the disclosure, the above-mentioned conductive frame includes a slit, so that the conductive frame has an unenclosed annular shape. The conductive frame is adapted to resonate at a second frequency band, and the length from the first ground terminal, the feeding terminal to the slit is one-fourth wavelength of the second frequency band.

In an embodiment of the disclosure, the above-mentioned slit is filled with an insulating block.

In an embodiment of the disclosure, the above-mentioned insulating member is in an annular shape, and the insulating member is disposed in the gap between the conductive bottom shell and the conductive frame.

In an embodiment of the disclosure, the above-mentioned wearable device further includes a screen, which is electrically connected to the circuit board and disposed on the conductive frame.

Based on the above, the conductive frame of the wearable device of the embodiment may provide a fine-looking appearance and function as an antenna. The insulating member is disposed between the conductive bottom shell and the conductive frame to separate the conductive bottom shell and the conductive frame. The conductive bottom shell may be configured to reflect the energy of the antenna to converge the energy. In addition, when the wearable device is disposed on the human body, the conductive bottom shell is between the human body and the antenna. The conductive bottom shell may effectively reduce the electromagnetic waves to be absorbed by the human body from the antenna, thereby improving the antenna efficiency.

DESCRIPTION OF THE EMBODIMENTS

Figure 1:
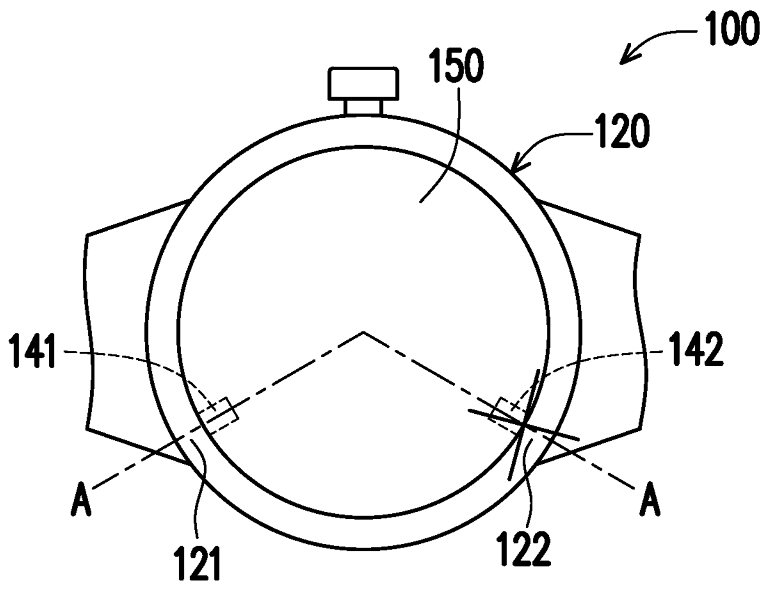
FIG. 1 is a schematic top view of a wearable device according to an embodiment of the disclosure.

FIG. 1 is a schematic top view of a wearable device according to an embodiment of the disclosure. Referring to FIG. 1, in the embodiment, a wearable device 100 is, for example, a main body of a smart watch, but the type of the wearable device 100 is not limited thereto.

Figure 2:
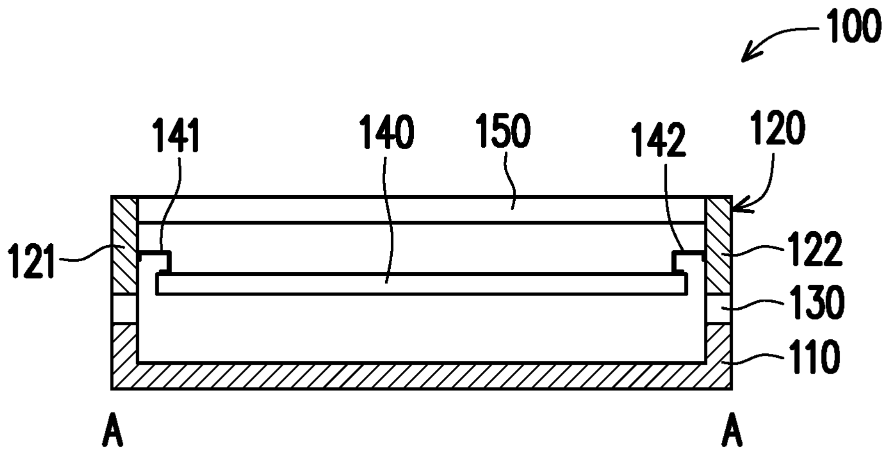
FIG. 2 is a schematic cross-sectional view of the wearable device of FIG. 1 along lines A and A.

FIG. 2 is a schematic cross-sectional view of the wearable device of FIG. 1 along lines A and A. Referring to FIG. 2, the wearable device 100 of the embodiment includes a conductive bottom shell 110, a conductive frame 120, an insulating member 130, and a circuit board 140. The conductive frame 120 is disposed above the conductive bottom shell 110 and separated from the conductive bottom shell 110. In the embodiment, the conductive frame 120 functions as an antenna, and the conductive frame 120 includes a feeding terminal 121 and a first ground terminal 122.

Referring to FIG. 1, the conductive frame 120 is adapted to resonate at a first frequency band, and the length of the feeding terminal 121 along the conductive frame 120 to the first ground terminal 122 is one-half wavelength of the first frequency band. The first frequency band is, for example, WiFi 2.4 GHz, but the first frequency band is not limited thereto. That is, the designer may adjust the length from the feeding terminal 121 to the first ground terminal 122 if required, so that the conductive frame 120 may excite at the desired frequency band.

In the embodiment, the insulating member 130 is in an annular shape. Please refer to FIG. 2 again. The insulating member 130 is disposed in the gap between the conductive bottom shell 110 and the conductive frame 120. Moreover, the insulating member 130 is connected to the conductive bottom shell 110 and the conductive frame 120 to insulate the conductive bottom shell 110 from the conductive frame 120. Therefore, the conductive bottom shell 110 is not in conduction with the conductive frame 120, and the current of the conductive frame 120 does not flow to the conductive bottom shell 110.

The circuit board 140 is disposed inside the conductive frame 120 and separated from the conductive bottom shell 110. That is, the circuit board 140 is not conducted to the conductive bottom shell 110. In addition, the feeding terminal 121 and the first ground terminal 122 of the conductive frame 120 are electrically connected to the circuit board 140.

Specifically, the circuit board 140 includes a first elastic piece 141 and a second elastic piece 142. The first elastic piece 141 abuts the feeding terminal 121, and the second elastic piece 142 abuts the first ground terminal 122. Certainly, how the feeding terminal 121 and the first ground terminal 122 are electrically connected to the circuit board 140 is not limited thereto.

In addition, the wearable device 100 further includes a screen 150, which is electrically connected to the circuit board 140 and disposed on the conductive frame 120. In an embodiment, the wearable device 100 may further include a battery, a speaker, or a vibrator, etc., which is not limited to the drawings. Furthermore, in the embodiment, the outer contours of the conductive frame 120, the conductive bottom shell 110, and the insulating member 130 have, for example, circular shapes. However, in other embodiments, the outer contours of the conductive frame 120, the conductive bottom shell 110, and the insulating member 130 may be square, rectangular, oval, or polygonal.

The conductive frame 120 of the wearable device 100 in the embodiment is, for example, a metal frame, which may provide a fine-looking appearance. The conductive frame 120 itself functions as an antenna, and may resonate at the desired frequency band. Therefore, the conductive frame 120 itself has the functions of the housing and the antenna at the same time. Since the conductive frame 120 is the antenna, it is not necessary for the wearable device 100 to have an additional antenna and a holder to support the antenna, the volume of the wearable device 100 may be reduced, or the required elements may be more flexibly placed in the internal space of the wearable device 100.

In addition, the conductive bottom shell 110 may be configured to reflect the antenna's power from the conductive frame 120, so that the antenna's power may be convergent and radiated toward the screen 150, thereby improving the antenna efficiency. Furthermore, the insulating member 130 is disposed between the conductive bottom shell 110 and the conductive frame 120 to prevent the current of the conductive frame 120 from flowing to the conductive bottom shell 110. Since the insulating member 130 prevents the conductive frame 120 from conducting electricity to the conductive bottom shell 110, the conductive bottom shell 110 is not a part of the antenna. When the wearable device 100 is worn on a human body, the conductive bottom shell 110 is between the human body and the antenna. The conductive bottom shell 110 may function as a shielding structure, which may not only improve the antenna efficiency, but also effectively reduce the electromagnetic waves to be absorbed by the human body from the antenna.

Figure 3:
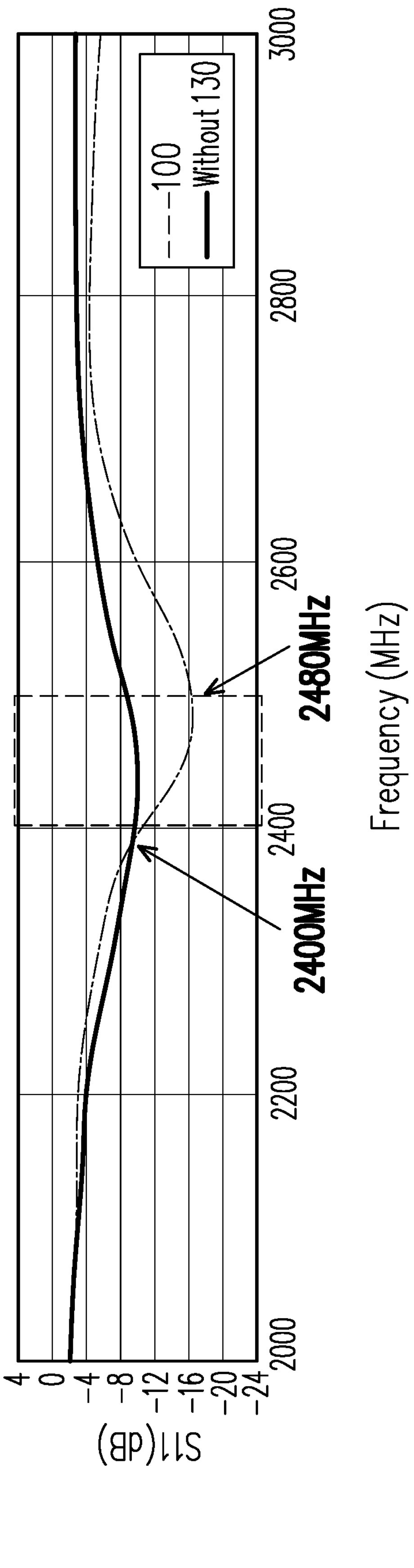
FIG. 3 is a plot diagram of frequency vs. S11 for the wearable device of FIG. 1.
Figure 4:
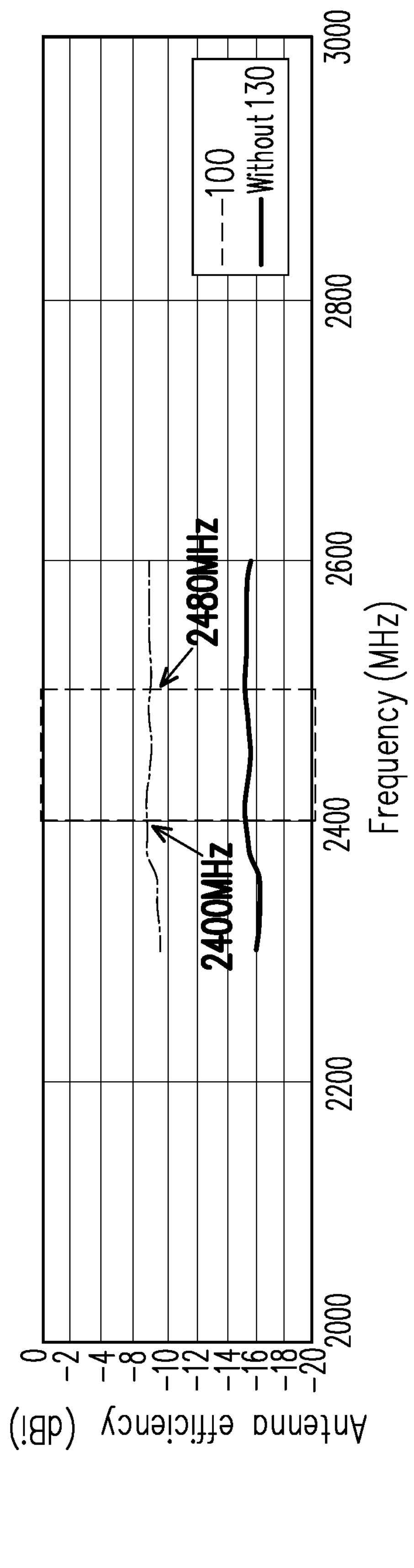
FIG. 4 is a plot diagram of frequency vs. antenna efficiency for the wearable device of FIG. 1.

FIG. 3 is a plot diagram of frequency vs. S11 for the wearable device of FIG. 1. FIG. 4 is a plot diagram of frequency vs. antenna efficiency for the wearable device of FIG. 1. Please refer to FIGS. 3 and 4. Comparing the wearable device 100 of the embodiment with a device of which the entire housing is made of metal (i.e., without the insulating member 130), the wearable device 100 of the embodiment performs significantly better on S11 and the antenna efficiency in the frequency range of 2400 MHz to 2480 MHz.

Figure 5:
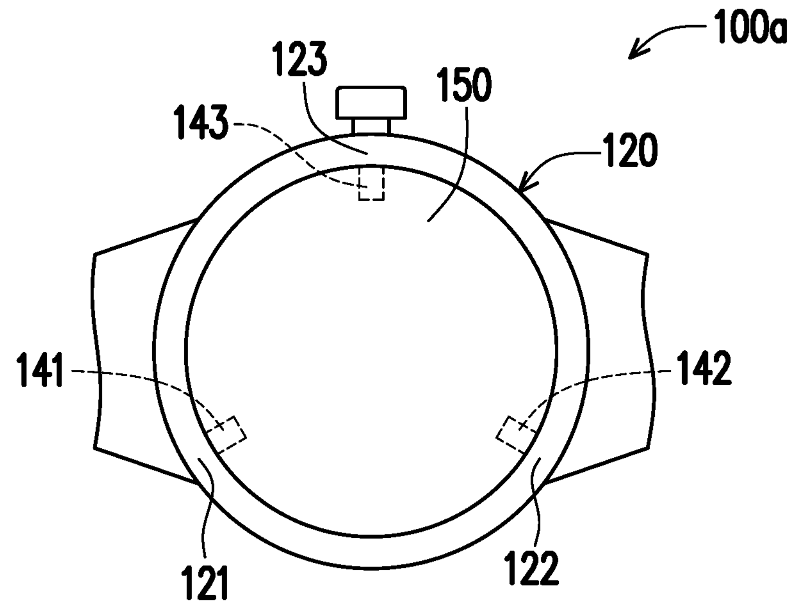
FIGS. 5 to 7 are schematic top views of various wearable devices according to other embodiments of the disclosure, respectively.
Figure 6:
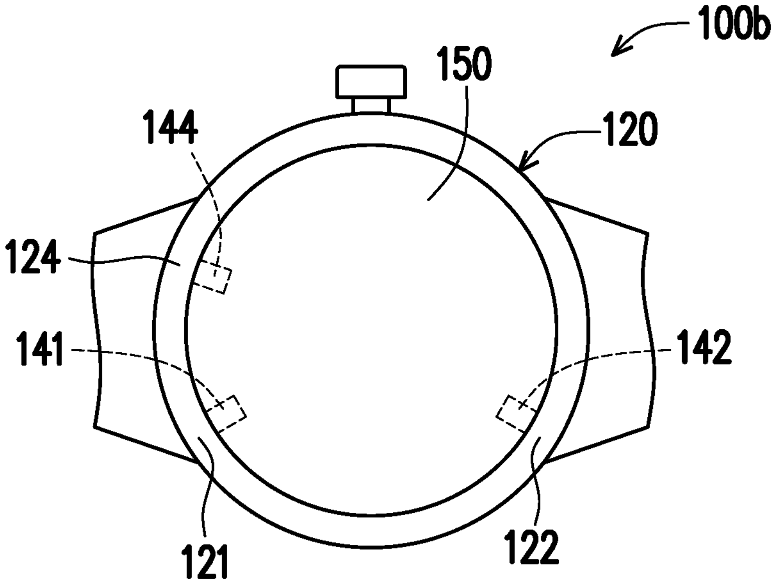
Figure 7:
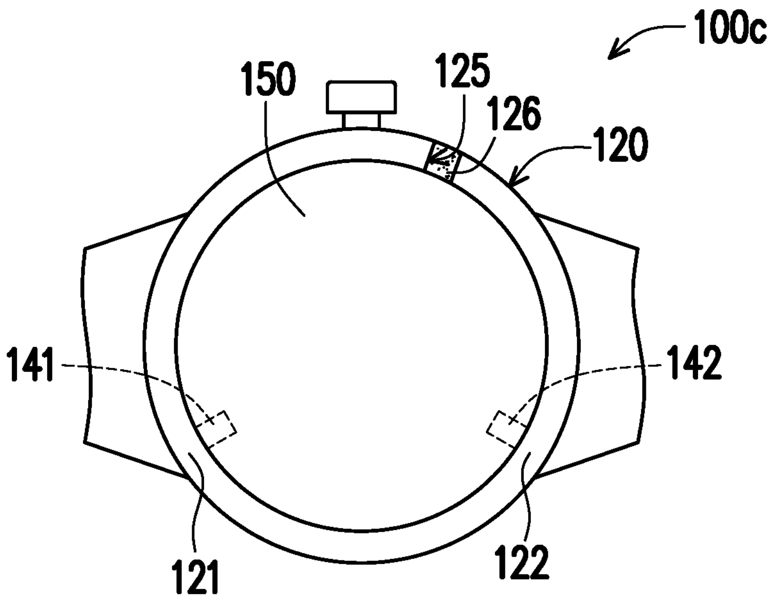

FIGS. 5 to 7 are schematic top views of various wearable devices according to other embodiments of the disclosure. Please refer to FIG. 5 first. The main difference between a wearable device 100*a* of this embodiment and the wearable device 100 of FIG. 1 is that in this embodiment, the conductive frame 120 further includes a second ground terminal 123, and the second ground terminal 123 is electrically connected to the circuit board 140. Specifically, the circuit board 140 includes a third elastic piece 143, and the third elastic piece 143 abuts the second ground terminal 123.

In the embodiment, the length from the feeding terminal 121 to the second ground terminal 123 along the conductive frame 120 is the same as the length from the feeding terminal 121 to the first ground terminal 122 along the conductive frame 120, and both of the lengths are one-half wavelength of the first frequency band. That is, the first ground terminal 122 and the second ground terminal 123 are symmetrically located on the opposite sides of the feeding terminal 121. In the embodiment, the wearable device 100*a* may increase the bandwidth of the first frequency band through the above-mentioned design, thereby providing a broadband effect.

Referring to FIG. 6, the main difference between a wearable device 100*b* of this embodiment and the wearable device 100*a* of FIG. 5 is that in this embodiment, the length from the feeding terminal 121 to the second ground terminal 124 is different from the length from the feeding terminal 121 to the first ground terminal 122. A third elastic piece 144 abuts the second ground terminal 124. In addition to the first frequency band, the conductive frame 120 is further adapted to resonate at the second frequency band different from the first frequency band, and the length from the feeding terminal 121 to the second ground terminal 124 is one-half wavelength of the second frequency band.

That is, in the embodiment, the section from the feeding terminal 121 to the first ground terminal 122 may be configured to resonate at the first frequency band, and the section from the feeding terminal 121 to the second ground terminal 124 may be configured to resonate at the second frequency band. Therefore, the wearable device 100*b* of the embodiment may provide multi-band operation.

Referring to FIG. 7, the main difference between a wearable device 100*c* of this embodiment and the wearable device 100 of FIG. 1 is that in the embodiment, the conductive frame 120 includes a slit 125, and the conductive frame 120 has an unenclosed annular shape. The slit 125 is optionally filled with an insulating block 126 to complete the appearance.

In the embodiment, in addition to the first frequency band, the conductive frame 120 is further adapted to resonate at the second frequency band different from the first frequency band. The length from the first ground terminal 122, the feeding terminal 121 to the slit 125 is one-quarter wavelength of the second frequency band.

That is, in the embodiment, the section from the feeding terminal 121 to the first ground terminal 122 may be configured to resonate at the first frequency band, and the section from the first ground terminal 122, the feeding terminal 121 to the slit 125 may be configured to resonate at the second frequency band. Therefore, the wearable device 100*c* of the embodiment may provide multi-band operation.

In summary, the conductive frame of the wearable device of the embodiment may provide a fine-looking appearance and function as an antenna. The insulating member is disposed between the conductive bottom shell and the conductive frame to separate the conductive bottom shell and the conductive frame. The conductive bottom shell may be configured to reflect the power of the antenna to make the power convergent. In addition, when the wearable device is worn on a human body, the conductive bottom shell is between the human body and the antenna. The conductive bottom shell may effectively reduce the electromagnetic waves to be absorbed by the human body from the antenna, thereby improving the antenna efficiency.

What is claimed is:

1. A wearable device, comprising:

a conductive bottom shell;

a conductive frame, disposed above the conductive bottom shell and separated from the conductive bottom shell, and the conductive frame operating as an antenna and comprising a feeding terminal and a first ground terminal;

an insulating member, disposed between the conductive bottom shell and the conductive frame, and preventing the conductive bottom shell from conducting electricity to the conductive frame; and a circuit board, disposed inside the conductive frame, separated from and not electrically connected to the conductive bottom shell and disposed between the insulating member and the conductive frame, and the feeding terminal and the first ground terminal being electrically connected to the circuit board.

2. The wearable device according to claim 1, wherein the circuit board comprises a first elastic piece and a second elastic piece, the first elastic piece abuts the feeding terminal, and the second elastic piece abuts the first ground terminal.

3. The wearable device according to claim 1, wherein the conductive frame is adapted to resonate at a first frequency band, and a length from the feeding terminal to the first ground terminal is one-half wavelength of the first frequency band.

4. The wearable device according to claim 3, wherein the conductive frame comprises a second ground terminal, the second ground terminal is electrically connected to the circuit board, and a length from the feeding terminal to the second ground terminal is one-half wavelength of the first frequency band.

5. The wearable device according to claim 4, wherein the circuit board comprises a third elastic piece, and the third elastic piece abuts the second ground terminal.

6. The wearable device according to claim 1, wherein the conductive frame comprises a second ground terminal, the second ground terminal is electrically connected to the circuit board, the conductive frame is further adapted to resonate at a second frequency band different from the first frequency band, and the length from the feeding terminal to the second ground terminal is one-half wavelength of the second frequency band.

7. The wearable device according to claim 6, wherein the circuit board comprises a third elastic piece, and the third elastic piece abuts the second ground terminal.

8. The wearable device according to claim 1, wherein the conductive frame comprises a slit, so that the conductive frame has an unenclosed annular shape, and the conductive frame is adapted to resonate at a second frequency band, and a length from the first ground terminal, the feeding terminal to the slit is one-quarter wavelength of the second frequency band.

9. The wearable device according to claim 8, wherein the slit is filled with an insulating block.

10. The wearable device according to claim 1, wherein the insulating member is in an annular shape, and the insulating member is disposed in a gap between the conductive bottom shell and the conductive frame.

11. The wearable device according to claim 1, further comprising a screen, electrically connected to the circuit board and disposed on the conductive frame.

* * * * *